(12) United States Patent
Wilson et al.

(10) Patent No.: US 8,370,481 B2
(45) Date of Patent: Feb. 5, 2013

(54) INVENTORY MANAGEMENT IN A COMPUTING-ON-DEMAND SYSTEM

(75) Inventors: Christopher J. Wilson, Owings Mills, MD (US); Robert F. Novak, Catonsville, MD (US); Patrick M. Joanny, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 12/465,582

(22) Filed: May 13, 2009

(65) Prior Publication Data

US 2010/0293269 A1 Nov. 18, 2010

(51) Int. Cl.
*G06F 15/173* (2006.01)
(52) U.S. Cl. .......................... 709/224; 709/223; 709/246
(58) Field of Classification Search .................. 709/223, 709/224, 246
See application file for complete search history.

(56) References Cited

U.S. PATENT DOCUMENTS

| | | | |
|---|---|---|---|
| 7,039,008 B1* | 5/2006 | Howes et al. | 370/220 |
| 7,577,722 B1* | 8/2009 | Khandekar et al. | 709/220 |
| 7,600,160 B1* | 10/2009 | Lovy et al. | 714/57 |
| 7,613,847 B2* | 11/2009 | Kjos et al. | 710/22 |
| 7,802,248 B2* | 9/2010 | Broquere et al. | 718/1 |
| 8,145,785 B1* | 3/2012 | Finkelstein et al. | 709/233 |
| 2008/0250246 A1* | 10/2008 | Arditti et al. | 713/173 |

* cited by examiner

*Primary Examiner* — David Lazaro
*Assistant Examiner* — Marie Georges Henry

(57) ABSTRACT

A system may receive parameters for provisioning a resource object and may select network resources that correspond to the resource object based on the parameters, inventory information, and configuration information. In addition, the system may configure the selected network resources in accordance with the parameters and may monitor the selected network resources to obtain information on the selected network resources. Further, the system may update the inventory information and the configuration information based on the obtained information to reflect changes in state and configuration of the selected network resources.

18 Claims, 10 Drawing Sheets

INVENTORY MANAGEMENT IN A COMPUTING-ON-DEMAND SYSTEM

BACKGROUND INFORMATION

An in-house system developer may sometimes purchase and stage devices to build a system. When purchasing the devices, the system developer may evaluate device specifications, price, and/or equipment compatibility in light of particular project requirements. When staging the devices, the system developer may install operating systems, applications, databases and web servers, may apply patches, and/or may configure the devices.

DETAILED DESCRIPTION OF PREFERRED EMBODIMENTS

The following detailed description refers to the accompanying drawings. The same reference numbers in different drawings may identify the same or similar elements.

As described below, a system may track an inventory of resources in a network. In the system, a resource object may correspond to a set of network resources whose configuration and inventory information may be stored in databases. When the resource object is provisioned, de-provisioned, configured, monitored or controlled, the inventory information and the configuration information are updated in the databases.

Because the resource object accurately reflects the configuration and/or states of corresponding resources, a user may be quickly and efficiently provisioned with network resources, may control, and/or may monitor the network resources (e.g., a server, a server farm, a load balancer, etc.) by selecting, controlling, and/or monitoring the corresponding resource object.

Figure 1:
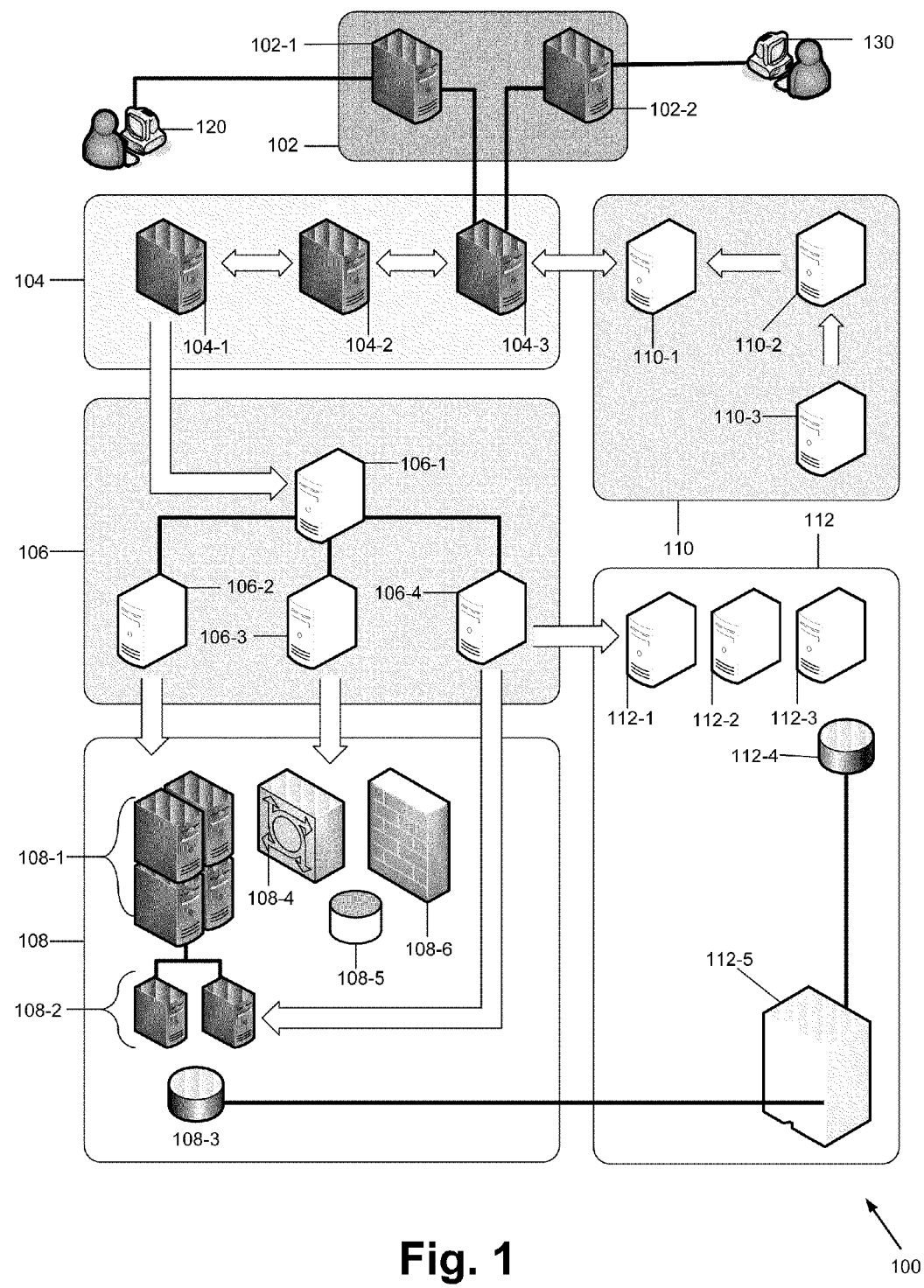
FIG. 1 is a diagram illustrating an exemplary network in which concepts described herein may be implemented.

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity and ease of understanding, network 100 of FIG. 1 does not show other network or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, etc.).

User portal device 102-2 may interact with and relay information between a user device, illustrated as item 130, and resource management network 104. User device 130 may access provisioning services that are available via user portal device 102-2. For example, user device 130 may request resource management network 104 to provide user device 130 with a set of virtual machines.

Resource management network 104 may provide provisioning services. In providing the provisioning services, resource management network 104 may track pools of resources that are available to user device 130, reserve a portion of the resources based on a request from user device 130, and allocate the reserved resources to user device 130. In addition, resource management network 104 may deallocate the resources (e.g., return the portion to the pool) when user device 130 indicates that the user does not need the resources.

In addition, resource management network 104 may provide support for administrative tasks (e.g., administer user, perform resource allocation tasks that a user is not authorized to perform, etc.).

As further shown in FIG. 1, resource management network 104 may include a job database device 104-1, resource management database 104-2, and resource management device 104-3. Job database device 104-1 may receive a job description (e.g., a list of tasks) from resource management device 104-3 and store it in an active job queue until the job is performed. Resource management database 104-2 may store and/or retrieve configuration/usage data pertaining to a particular user and/or other bookkeeping information.

Resource management device 104-3 may provision/de-provision resources based on inventory information provided by inventory management network 110. To provision/de-provision the resources, resource management device 104-3 may create description of a job based on user input relayed by user portal device 102-2, based on user configuration, and based on available resources. Resource management device 104-3 may handoff the job description to job database device 104-3, to be placed in the active job queue.

Workflow network 106 may perform jobs whose descriptions are in the active job queue at job database device 104-1.

Once the job is performed, workflow network 106 may instruct job database device 104-1 to dequeue the job description. As further shown in FIG. 1, workflow network 106 may include a workflow engine device 106-1, virtual machine management (VMM) control device 106-2, network management device 106-3, and resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1. When workflow engine device 106-1 is about to perform the subtasks associated with creating the virtual machine, work flow engine device 106-1 may dispatch one or more requests for performing virtual machine-related functions to VMM control device 106-2 (e.g., a request to create the virtual machine).

VMM control device 106-2, upon receiving requests from work flow engine device 106-1, may control and/or monitor one or more virtual machines by interacting with hypervisors. The term "hypervisor," as used herein, may refer to a program that monitors, creates, runs, removes, and/or controls a virtual machine (e.g., controls a lifecycle of a virtual machine) on a physical device. For example, when VMM control device 106-2 receives a request to create a virtual machine from work flow engine device 106-1, VMM control device 106-2 may issue a command to a hypervisor. The hypervisor may create the virtual machine on the host device.

Network management device 106-3 may perform network configuration functions on behalf of work flow engine device 106-1. The functions may include configuring a port, modifying a firewall rule, changing parameters related to ports (e.g., port speed), etc. FIG. 1 shows a number of different types of network objects that network management device 106-3 may manage, such as, for example, a virtual load balancer 108-4, virtual LAN 108-5, and virtual firewall 108-6. Virtual load balancer 108-4, virtual LAN 108-5, and virtual firewall 108-6 are further described below.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below.

Virtual system network 108 may include devices and/or components for hosting and implementing virtual machine-related and network component-related resources that may be provisioned for the user. As shown, these resources may include a hypervisor cluster 108-1, virtual machines 108-2, logical volume 108-3, virtual load balancer 108-4, virtual LAN 108-5, and virtual firewall 108-6.

Hypervisor cluster 108-1 may include a logical group of hypervisors and a hypervisor manager (not shown). When hypervisor cluster 108-1 receives a command or a request from VMM control device 106-2 (e.g., create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk on storage area network (SAN), etc.). Local volume 108-3 may be allocated as a resource by work flow engine 106-1. Once allocated, logical volume 108-1 may be mounted on a mount point on a virtual machine and used as storage (e.g., a file system, swap space, etc.). Virtual load balancer 108-4 may include an emulation of load balancer, and may be instantiated or removed upon demand from user device 130. The user may configure virtual load balancer 108-4 such that network traffic is distributed over the virtual and/or physical resources in accordance with specified thresholds (e.g., 40% of network traffic to one of virtual machines 108-2 and 60% of network traffic the other virtual machine). Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information and/or configuration information to resource management network 104. As further shown in FIG. 1, inventory management network 110 may include IP address management device 110-1, data warehouse device 110-2, and an inventory management device 110-3.

IP address management device 110-1 may provision an IP address from a pool of IP addresses. In one implementation, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to a pool of IP addresses.

Data warehouse device 110-2 may include database of configuration information or configuration management information (e.g., a version of an operating system that is installed on a provisioned physical server for a particular build). When a resource is added to a pool, is provisioned or de-provisioned, data warehouse device 110-2 may update/record the configuration management information about the resource in the database.

Inventory management device 110-3 may obtain inventory information by monitoring physical devices (e.g., track a physical location of a resource, track its availability for provisioning, etc.), store the inventory information, and/or provide the inventory information to other devices (e.g., the location of the resource, state of the resource (e.g., "provisioned" or "available", etc.). In many instances, inventory management device 110-3 and data warehouse device 110-2 may work together to provide resource management device 104-3 with information to identify physical resources that may be provisioned. For example, resource management device 104-3 may obtain a list of physical devices in network 112 from inventory management device 110-3 and determine which of the listed physical devices are not yet provisioned, based on configuration information provided by database warehouse device 110-2.

Physical resource network 112 may include physical resources. These physical resources may be provisioned/de-provisioned upon a request from resource lifecycle management device 106-4. When physical resources in physical resource network 112 are provisioned, de-provisioned, or (re)-configured, resource lifecycle management device 106-4 may update data warehouse device 110-2 with information about the provisioning and configuration information. In addition, if a number of physical resources in physical resource network 112 increases or decreases (e.g., due a purchase, device failure, etc.), inventory management device 110-1 may record the changes.

As further shown in FIG. 1, physical resource network 112 may include physical resources 112-1 through 112-3 (individually referred to as physical resource 112-x and collectively as physical resources 112-X), logical volume 112-4, and storage device 112-5. Physical resource 112-x may include a physical device or a component that may be provisioned via resource lifecycle management device 106-4. Logical volume 112-4 may include similar component as logical volume 108-3, and may operate similarly. Unlike logical volume 108-3 that is mounted on a virtual machine, however, logical volume 112-3 may be mounted on physical resource 112-x. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 though 112 may include additional, fewer, or different components than those shown in FIG. 1. In addition, depending on the implementation, functionalities of each of devices within networks 102-112 may be aggregated over fewer devices or distributed over additional devices. For example, in one implementation, functionalities of devices 112-1 through 112-3 in resource management network 112 may be provided by a single server device.

Figure 2:
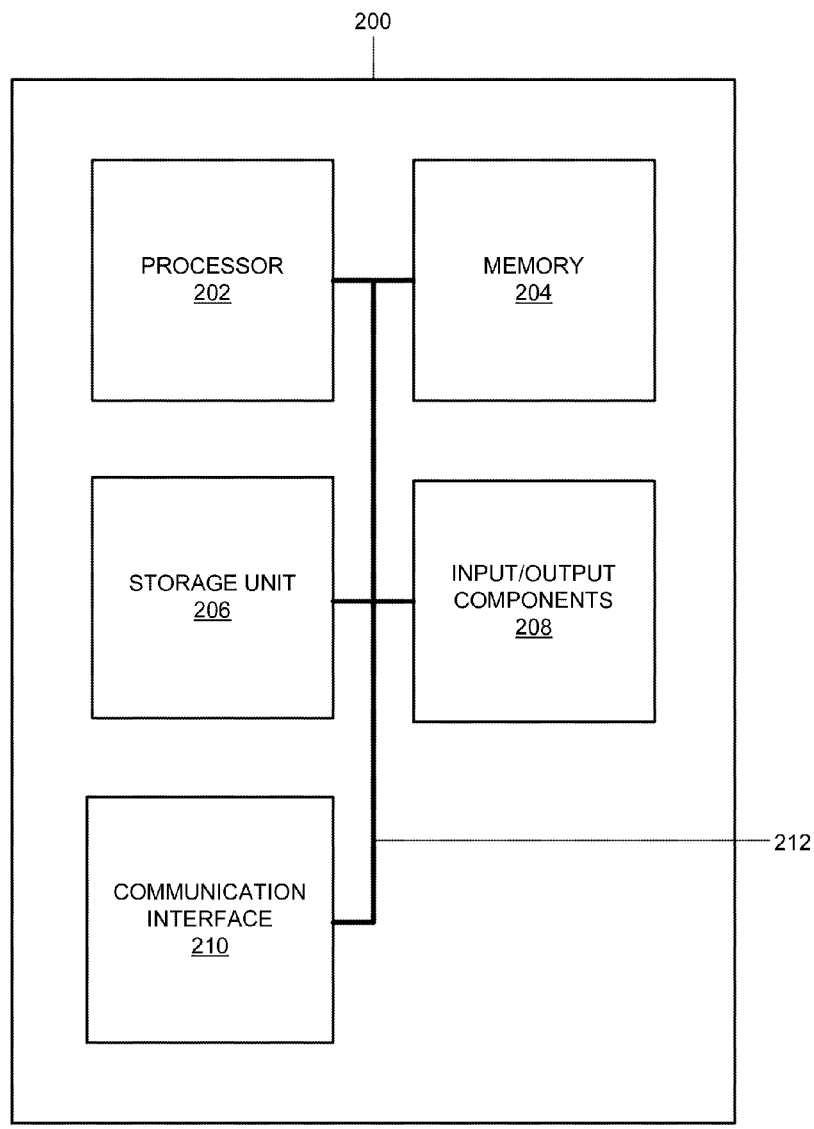
FIG. 2 is a block diagram of an exemplary network device shown in FIG. 1.

FIG. 2 is a block diagram of an exemplary network device 200. Network device 200 may be used to implement each of devices 104-1 through 104-3, 106-1 through 106-4, 110-1 through 110-3, 112-1 through 112-3, and 112-5. In addition, network device 200 may also be used to implement components of a device that hosts a hypervisor. As shown in FIG. 2, network device 200 may include a processor 202, memory 204, storage unit 206, input/output components 208, communication interface 210, and bus 212.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5).

Input/output components 208 may include a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 200.

Communication interface 210 may include any transceiver-like mechanism that enables network device 200 to communicate with other devices and/or systems. For example, communication interface 210 may include mechanisms for communicating via a network. In these embodiments, communication interface 210 may include one or more network interface cards (e.g., an Ethernet interface) for communicating with other devices. In other implementations, communication interface 210 may include radio frequency (RF) transmitters, receivers and/or transceivers and one or more antennas for transmitting and receiving RF data. Bus 212 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc.

Figure 3:
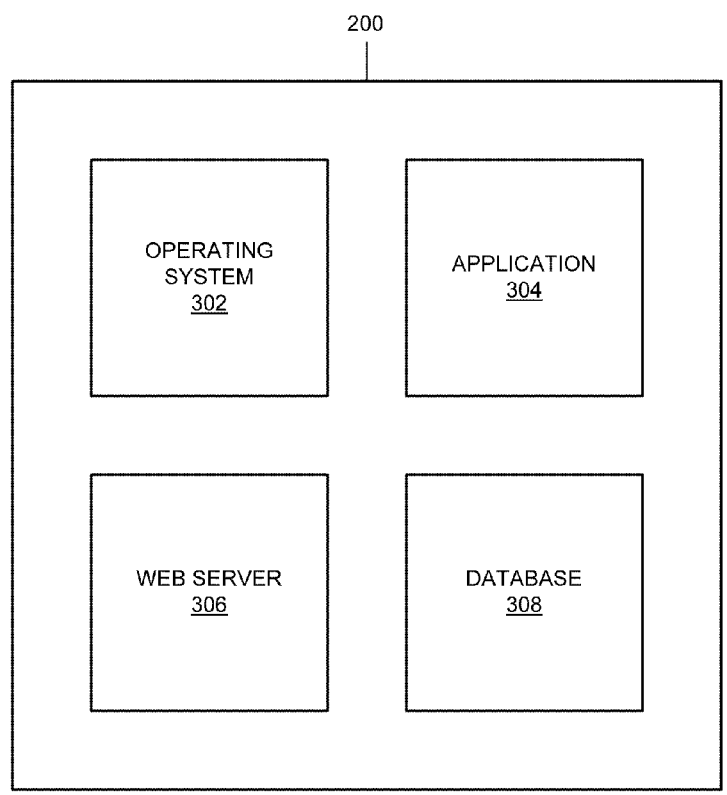
FIG. 3 is a block diagram illustrating exemplary functional components of the network devices shown in FIG. 1.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/IP stack), event notifications, etc.

Application 304 may include software program and/or scripts for rendering services. For example, in resource management device 104-3, application 304 may take the form of one or more programs for provisioning resources. Other examples of application 304 include a file transfer protocol (FTP) server, an email server, a telnet server, servlets, Java™ virtual machine (JVM), web containers, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Database 308 may include records and files and may act as an information repository for network device 200. For example, in resource management database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
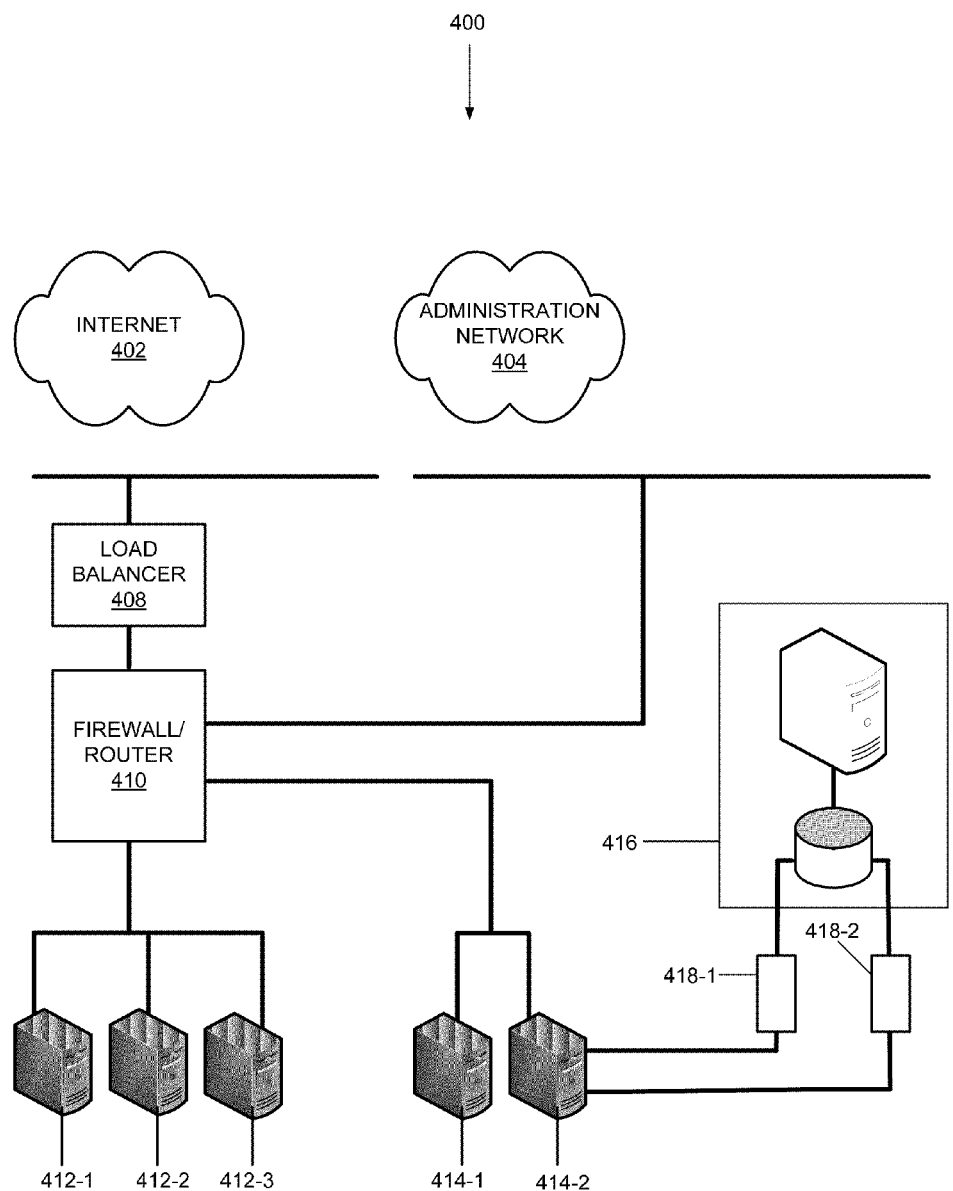
FIG. 4 is a diagram of exemplary resources that the system of FIG. 1 may provision.

FIG. 4 is a diagram of exemplary resources that network 100 may provision. As shown in FIG. 4, a user may be provisioned with connectivity to the Internet 402, administration network 404, load balancer 408, firewall/router 410, virtual server devices 412-1 through 412-3, physical server devices 414-1 and 414-2, storage device 416, and fiber channels 418-1 and 418-2.

Administration network 404 may provide services such as a backup service, security service, billing, etc. Load balancer 408 may balance network traffic over different devices (e.g., load balance between virtual server devices 412-1 through 412-3 and physical server devices 414-1 and 414-2). Firewall/router 410 may safeguard virtual server devices 412-1 through 412-3 and physical server devices 414-1 and 414-2 from outside networks via enforcement of firewall security rules and/or network address translation (NAT). Virtual server devices 412-1 through 412-3 may host applications in virtual environments. Physical server devices 414-1 and 414 may host applications in physical devices. Each of physical server devices 414 may access storage device 416 via one of two channels 418-1 and 418-2, which are provided for redundancy in case of a fiber channel failure.

The user at user device 130 may request network 100 to provision the user with one or more instances of network 600, each containing one or more components 608-618 and access to networks 602 and 604 via user portal device 102-2. For example, via a web interface, a user at user device 130 may specify number of virtual machines, physical devices, and/or network components for provisioning.

Figure 5:
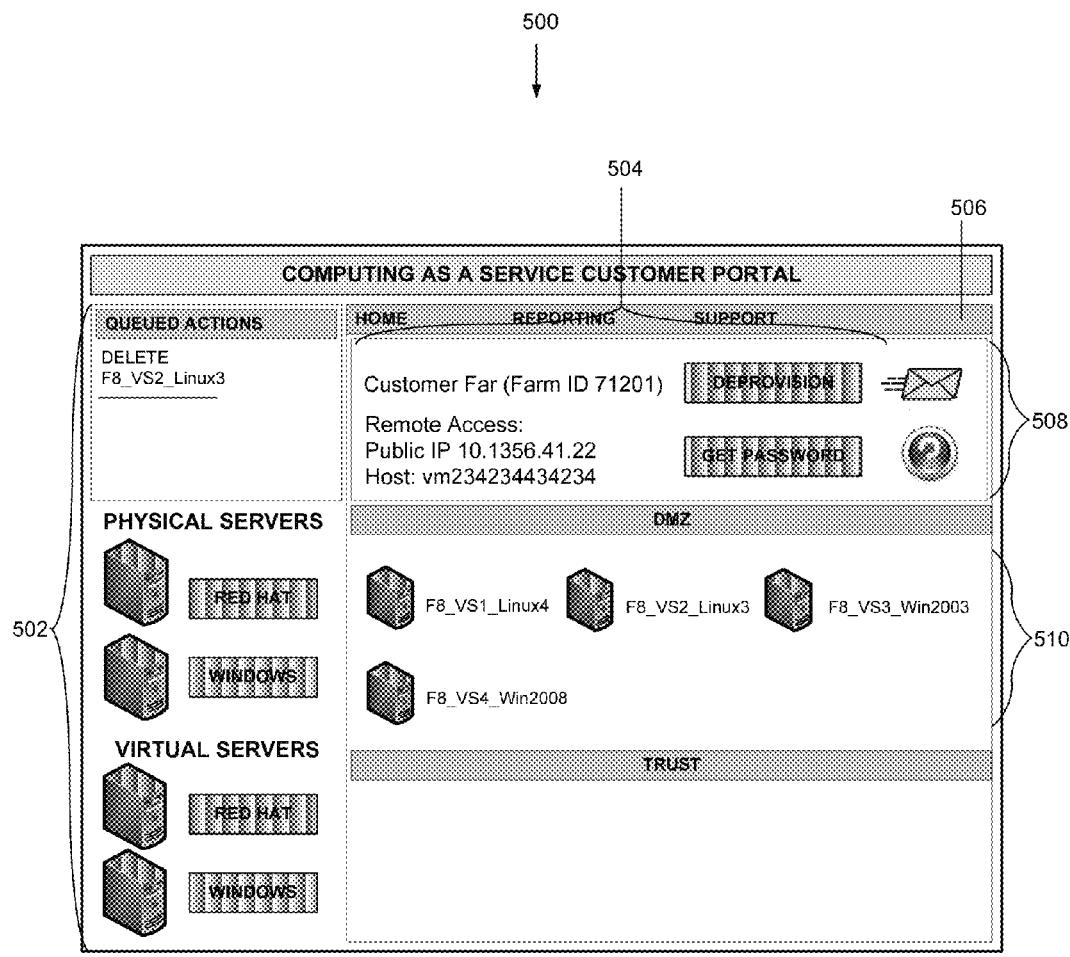
FIG. 5 illustrates an exemplary view of a web-based user interface for managing resources.

FIG. 5 illustrates an exemplary view 500 of a web-based user interface for controlling, monitoring, provisioning, and/or de-provisioning resources. More specifically, view 500 shows a web page for monitoring provisioned resources. Some features of a typical web browser, such as navigation bar, are not illustrated for the sake of ease in presentation.

As shown, the web page may include a side pane 502 and a main pane 504. Side pane 502 may include a list of servers and jobs that are pending. Main pane 504 may include menu bar 506, shortcut buttons 508, and server display 510. Menu bar 506 may provide links to other web pages, such as "Home," "Reporting," and "Support" pages. Shortcut buttons 508 may include buttons for executing commands, e.g., "deprovision" or "get password." Server display 510 may illustrate servers that are currently accessible. Depending on the implementation, the web page may include additional, fewer, or different features than those shown in FIG. 5.

Figure 6:
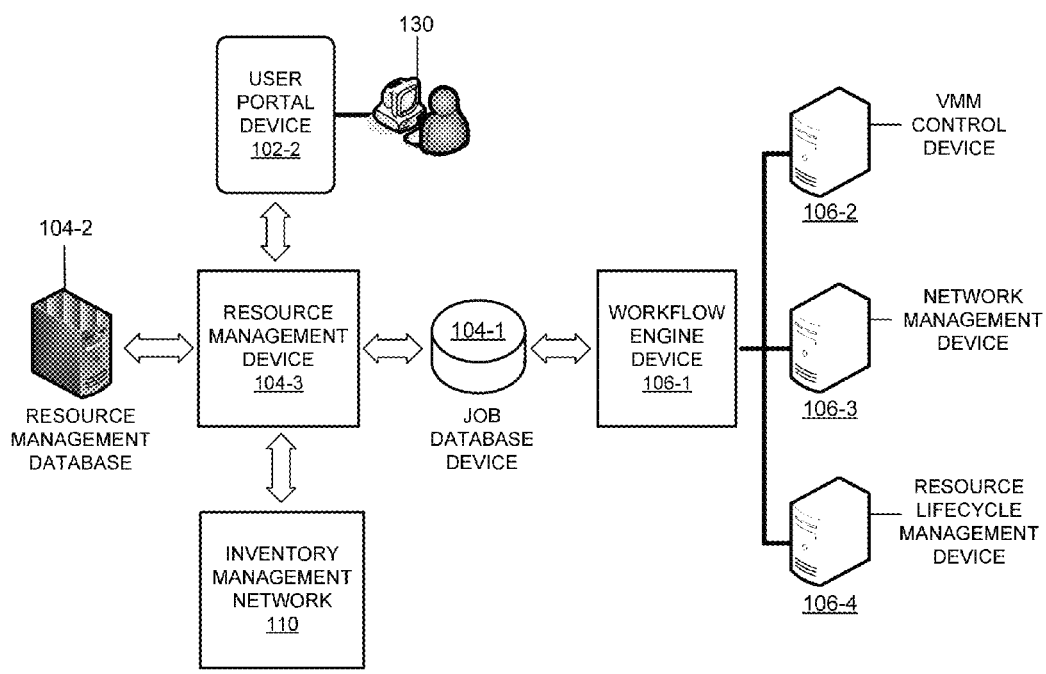
FIG. 6 is a diagram illustrating exemplary interaction between devices of FIG. 1 for provisioning and/or managing resources.

FIG. 6 illustrates an exemplary interaction between the devices of FIG. 1 for provisioning and/or managing resources. As shown in FIG. 6, user device 130 may interact with resource management device 104-2 via user portal device 102-2.

As further shown in FIG. 6, user portal device 102-2 may provide a user request for provisioning to resource management device 104-3. In response, resource management device 104-3 may obtain user-related information and information on farm objects from resource management database 104-2. As used herein, the term "farm object" may refer to an object that contains a collection of objects that represent network devices and/or networks. In addition, resource management device 104-3 may obtain inventory information and configuration information from inventory management network 110 (not shown). Resource management device 104-3 may collect such information to create a job description for provisioning a farm and/or network devices (e.g., server devices). The job description may be sent to job database device 104-1.

Workflow engine device 106-1 may poll job database device 104-1. When workflow engine device 106-1 discovers a new job at job database device 104-1, workflow engine device 106-1 may examine each of the subtasks described in the job description, and dispatches each subtask to one of three devices, VMM control device 106-2, network management device 106-3, and/or resource lifecycle management device 106-4. As discussed above, VMM control device 106-2, network management device 106-3, and resource lifecycle management device 106-4 may aid in provisioning virtual machines and related components, network components (e.g., virtual firewall), and physical devices.

In FIG. 6, a user at user device 130 may interact with resource management device 104-3 to provision and/or manage physical and/or virtual resources in networks 102-112. To facilitate the provisioning and/or management process, resources that the user can be provisioned with may be represented at resource management device 104-3 by a resource object that models characteristics of physical or virtual resources in networks 102-112.

Figure 7:
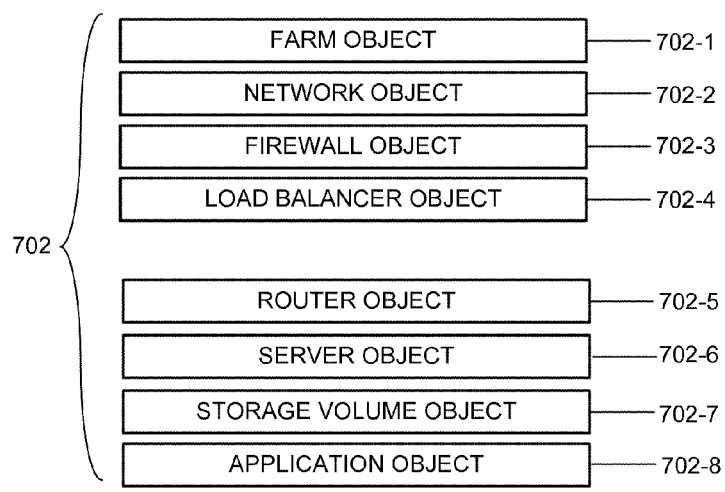
FIG. 7 is a list of exemplary resource objects that a user can provision.

FIG. 7 is a list of exemplary resource objects 702 that a user can provision. As shown, resource objects 702 may include a farm object 702-1, network object 702-2, firewall object 702-3, load balancer object 702-4, router object 702-5, server object 702-6, storage volume object 702-7, and application object 702-8. Within networks 102-112, each of objects 702-1 through 702-8 may represent a farm, network, virtual firewall 108-6, virtual load balancer 108-4, virtual router 108-5, physical server or virtual machine, logical volume (a logical unit of storage), and an application, respectively. Although networks 102-112 may include additional types of resources, objects that correspond to such types of resource are not illustrated for the purposes of simplicity and ease of understanding.

Figure 8A:
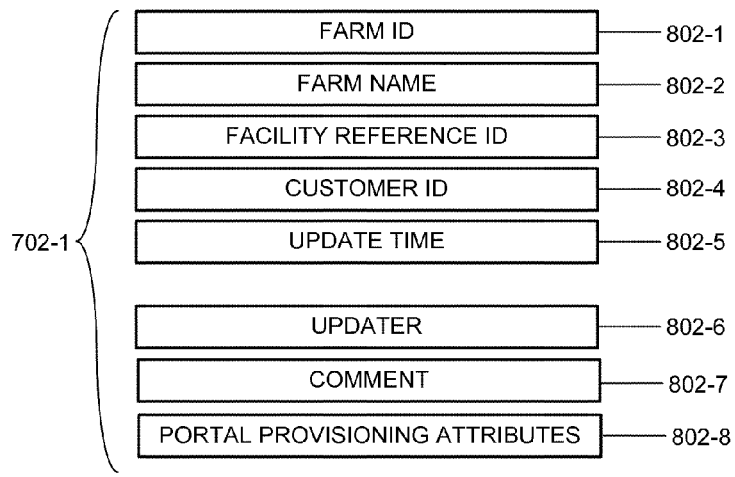
FIGS. 8A and 8B illustrate components of a farm object and a server object of FIG. 7.

FIG. 8A illustrates exemplary components of a farm object, e.g., farm object 702-1. As shown, farm object 702-1 may include a farm id 802-1, farm name 802-2, facility reference id 802-3, customer id 802-4, update time 802-5, updater 802-6, comment 802-7, and portal provisioning attributes 802-8. Depending on the implementation, farm object 702-1 may include additional, fewer, or different members.

Farm id 802-1 may include an identifier that is provided by resource management device 104-3 when farm object 702-1 is created. Farm name 802-2 may include a name that a user provides for the farm at user device 102-2. Facility reference id 802-3 may include a character string that identifies a data center (e.g., a logical grouping of servers and/or clusters) in which the provisioned farm is to reside. Customer id 802-4 may include an identifier assigned to the user by network 102-112. Update time 802-5 may identify the time at which the last change was made to any component of the farm. Updater 802-6 may identify the name of the user that performed the last update. Comment 802-7 may include user notes. Portal provisioning attributes 802-8 may include numbers or characters that describe a provisioning process (e.g., "provision pending," "provisioned," "deprovisioned," etc.). User portal device 102-2 may use the portal provisioning attributes 802-8 to proceed with different stages of resource provisioning.

Although not illustrated in FIG. 8A, because farm object 702-1 is a container object, farm object 702-1 may contain other resource objects 702, such as a router object 702-5, server object 702-6, etc.

Figure 8B:
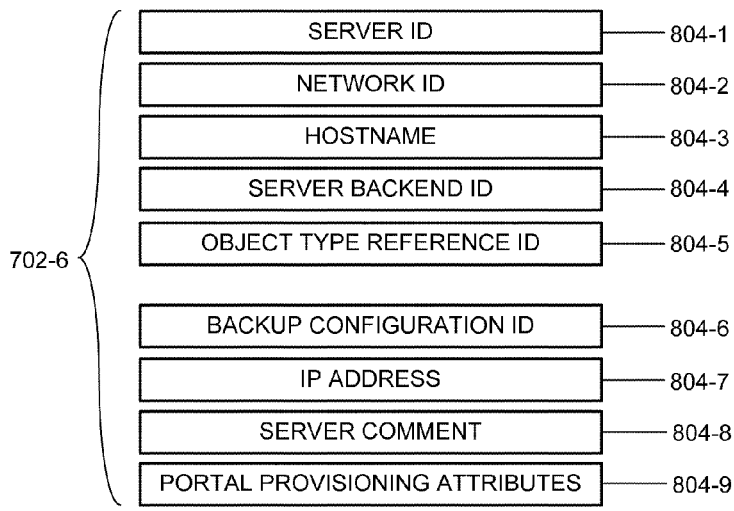

FIG. 8B illustrates exemplary components of a server object, e.g., server object 702-6. As shown, server object 702-6 may include server id 804-1, network id 804-2, hostname 804-3, server backend id 804-4, object type reference id 804-5, backup configuration id 804-6, IP address 804-7, server comment 804-8, and portal provisioning attributes 804-9. Other members (e.g., a member that provides a physical location of the server, a member that describes other state information, etc.) are not shown for sake of simplicity and ease of understanding. Depending on the implementation, server object 702-6 may include additional, fewer, or different members.

Server id 804-1 may include an identifier provided by resource management device 104-3 to uniquely identify each server object. Network id 804-2 may include an identifier assigned by resource management device 104-3 to identify the network that includes the server. Hostname 804-3 may include a server name provided by the user at user device 130. Server backend id 804-4 may include an identifier that is assigned to a corresponding server in networks 102-112 by a device in inventory management network (e.g., inventory management device 110-3). Object type reference id 804-5 may include either "PHYSICAL" or "VIRTUAL," to indicate whether server object 702-6 represents a physical server or a virtual machine. Backup configuration id 804-6 may include information to indicate the type of backup that may be provided for the server (e.g., a backup to a tape device, no backup, etc.). IP address 804-7 may include the server's IP address in networks 102-112. Server comment 804-9 may include user notes. Portal provisioning attributes 802-8 may include codes that describe provisioning process (e.g., "provision pending," "provisioned," "deprovisioned," etc.).

Figure 9:
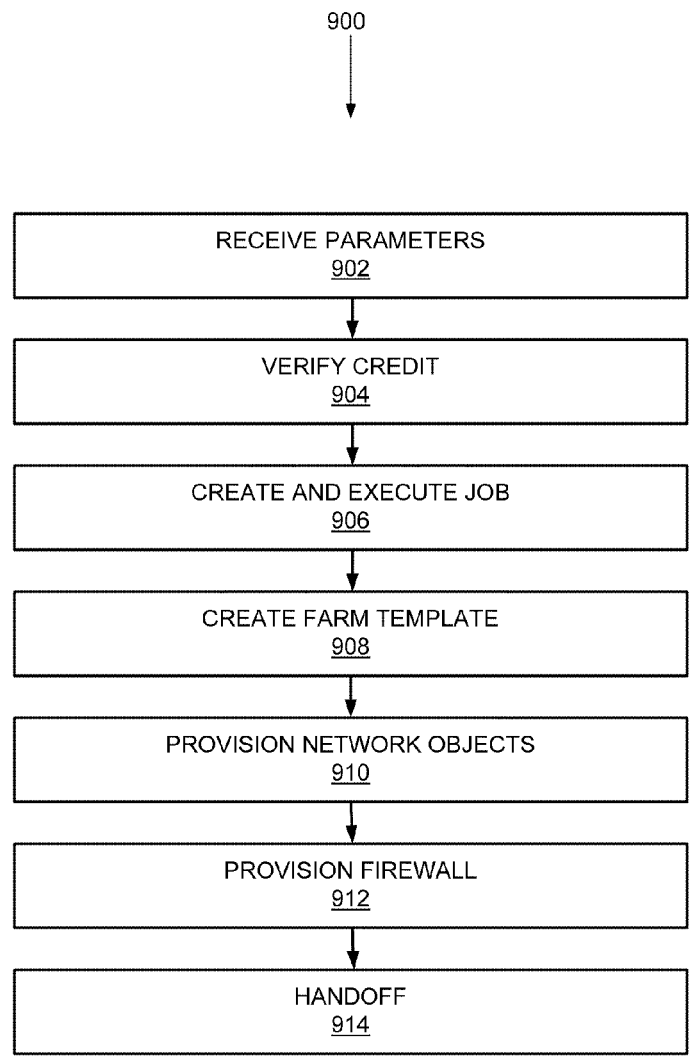
FIGS. 9 and 10 are flow diagrams of exemplary processes that are associated with provisioning a farm and a physical server, respectively.
Figure 10:
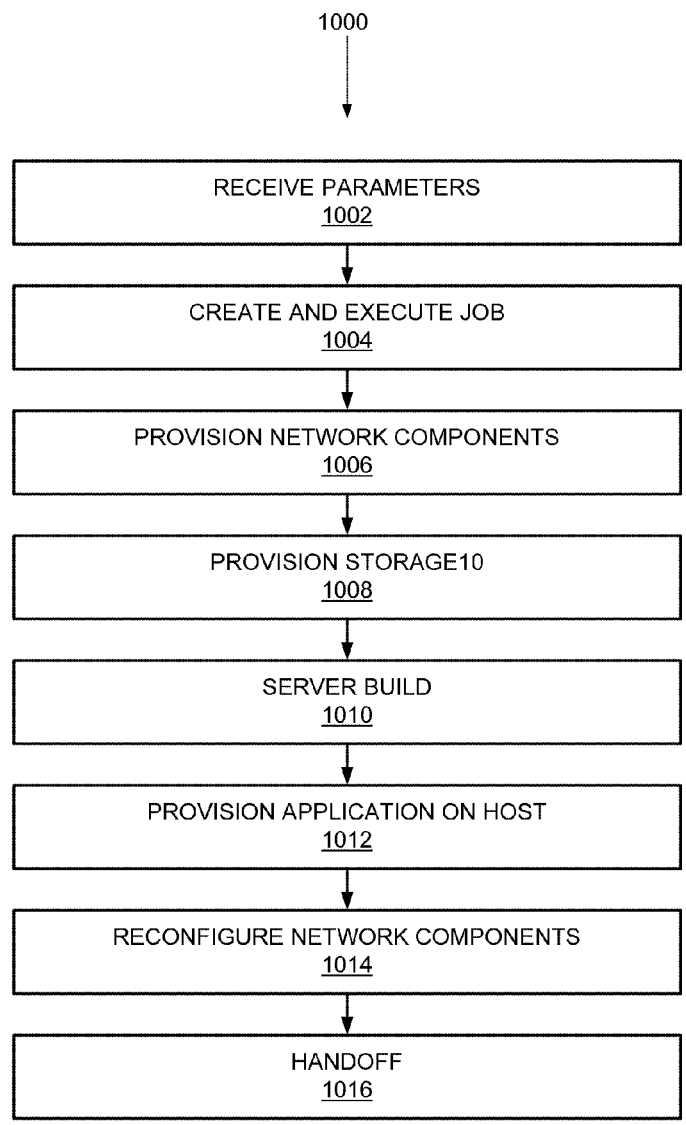

FIGS. 9 and 10 are flow diagrams of exemplary processes 900 and 1000 that are associated with provisioning a farm and a physical server, respectively. Although networks 104-112 may implement other processes for provisioning, de-provisioning, monitoring, and/or controlling other resources (e.g., process for provisioning storage volume, virtual firewall, etc.), they are not illustrated for the sake of simplicity and ease of understanding.

FIG. 9 is a flow diagram of an exemplary process that is associated with provisioning a farm. Process 900 may start at 902, where input parameters (e.g., parameters related to a farm, such as number of servers, network addresses, etc.) may be received at user portal device 102-2 or resource management device 104-3 (block 902). For example, the user may provide a design of the farm. In one implementation, the user may input the farm design while a job (e.g., provisioning a virtual machine) associated with the user is pending or is currently being performed.

Receiving the input from the user may involve validating the farm design and/or parameters, checking whether network 100 has enough capacity for provisioning based on inventory information and configuration information, and/or transforming the farm design/raw parameter that the user inputs into a design/parameters that may easily be accessed by a device in networks 104-112. For example, a user may provide a specification for provisioning a farm that contains ten physical server devices. Upon checking network capacity with inventory management network 110, resource management device 104-3 may determine that physical resource network 112 does not have a sufficient number of spare servers for provisioning and generate an error message.

A credit may be verified (block 904). For example, resource management device 104-3 may check whether the user is authorized to create the farm.

Upon validating the farm design and input parameters and/or checking the credit, resource management device 104-3 may create a job description (block 906), and convey the job description to job database device 104-1. Afterwards, workflow engine device 106-1, which may poll/check job database device 104-1, may detect the job description at job database device 104-1. Workflow engine 106-1 may perform a job that is associated with the job description (block 904).

A farm template may be created (block 908). Based on the input parameters and/or the farm design, a network device (e.g., resource lifecycle management device 106-4, etc.) may create a farm template for provisioning the farm. The farm template may specify configuration parameter for the network device (e.g., a hostname), network interconnections, network parameters, and/or other farm design parameters.

Network objects may be provisioned (block 910). Workflow engine device 106-1 may dispatch tasks for creating each network object of the farm to one or more of devices 106-2, 106-3, or 106-4. For example, workflow engine device 106-1 may instruct resource lifecycle management device 106-4 to provision four servers. In response to workflow engine device 106-1, resource lifecycle management device 106-4 may create and configure the servers in accordance with the farm template, created at block 908.

A firewall may be provisioned (block 912). In one implementation, if a firewall is specified in the farm template, the firewall may be provisioned automatically. Provisioning the firewall may include creating a firewall instance, applying firewall rules, configuring the firewall with respect to devices the farm, enabling the farm access, etc. In cases where the firewall is not specified, an existing firewall may be configured for the network devices of the farm.

A reference to the farm (e.g., network addresses of the devices in the farm, an identifier for the farm object, etc.) may be handed off or provided to the user (block 914).

FIG. 10 is a flow diagram of an exemplary process that is associated with provisioning a physical server. Process 1000 may start at 1002, where input parameters (e.g., disk space, operating system kernel parameters, semaphore count, limit on memory usage per process, etc.) may be received at user portal device 102-2 or resource management device 104-3 (block 1002). Receiving the input from the user or another component (e.g., resource management device 104-3 itself) may entail validating the parameters, checking whether network 100 has enough capacity for provisioning (e.g., whether a resource is available for provisioning etc.), and/or transforming raw parameter that the user inputs into parameters that may easily be accessed by a device in networks 104-112. For example, a user may provide a specification for provisioning three virtual machines, each with four CPUs. The specification may be translated into a form that resource management device 104-3 can easily process. In another example, a user may request networks 104-112 to provision of ten physical server devices. Upon checking resource availability and network capacity with inventory management network 110, resource management device 104-3 may determine that physical resource network 112 does not have a sufficient number of spare servers for provisioning. In such instances, resource management device 104-3 (or any other device handling the request) may generate an error message. In some implementations, such messages may be relayed back to the user.

Upon validating the input parameters, resource management device 104-3 may create a job description and handoff the job description to job database device 104-1 (block 1004). Afterwards, workflow engine device 106-1, which polls/checks job database device 104-1, may detect the job description at job database device 104-1. Workflow engine 106-1 may perform a job that is associated with the job description (block 1004).

Network components may be provisioned (block 1006). In performing the provisioning, workflow engine 106-1 may request network management device 106-3 to provision network infrastructure components. For example, network management device 106-3 may provision a virtual LAN and configure the virtual network with its associated subnets and routing information. In another example, network management device 106-3 may provision a virtual load balancer or a virtual firewall.

In addition, a firewall maybe provisioned. For example, in one implementation, a virtual firewall may be created on a host device and the IP address and/or the domain name of the physical server may be added to the list of server names in the firewall. In another implementation, an identifier for the physical server may be added to a rules database of an existing firewall.

Storage may be provisioned (block 1008). In one implementation, workflow engine device 106-1 may provision the storage. In provisioning the storage, a server device may be zoned in the same area of network as the storage. Furthermore, a particular amount of disk space may be mapped to a logical volume and mounted on a physical server (e.g., network mounting) as a boot disk/volume.

Server build may be performed (block 1010). The server build may include installing an operating system on the boot drive and configuring the operating system. In some implementations, the server build may entail installing patches, and/or configuring additional parameters (e.g., setting up swap space, defining number of semaphores, setting memory size, etc.).

An application may be provisioned for the host device (block 1012). After the completion of the server build, storage space for one or more applications may be provisioned. This may entail mounting a separate logical volume on the physical server. After allocating the storage space, the application may be installed in the allocated space. If necessary, additional patches may be applied.

Network components may be reconfigured (block 1014). Depending on the application that is installed, network parameters may need to be re-set. For example, in one implementation, a NIC port may need to be moved to an appropriate VLAN, and the Ethernet card may need to be reconfigured based on application specific network parameter values. In some implementations, the server name may be added to a domain name server (DNS) database.

A reference (e.g., a network address or the DNS name of the physical server that has been provisioned) may be provided/handed off to the user (block 1016). For example, a message may be sent to the user with the provisioning-related information (e.g., an indication that a physical device has been provisioned).

In processes 900 and 1000, when there is a change in configuration and/or inventory information, IP address management device 110-1, database warehouse device 110-2, and/or inventory management device 110-3 may be updated with changes in IP address information, resource configuration information, and/or inventory information. For example, if a new physical device is added to inventory management network 112, inventory management device 110-3 may update its inventory information. If a configuration of a resource in network 112 changes due to provisioning (e.g., a VLAN configuration changes), database warehouse device 112-2 may update its configuration management database.

The above paragraphs describe how a system may track inventory of resources in networks 102-112. For each resource in networks 102-112, the system may create, in memory, a corresponding resource object that models the resource. When a resource is provisioned or configured, the corresponding resource object is updated based on the changes in the resource and its configuration parameters. Conversely, when the resource is de-provisioned or deallocated, the resource object is updated to indicate that the resource is returned to an available pool from which it was provisioned.

The above paragraphs describe how a system may track inventory of resources in networks 102-112. In the system, a resource object may correspond to a set of network resources whose configuration and inventory information may be stored in databases. When the resource object is provisioned, de-provisioned, configured, monitored or controlled, the inventory information and the configuration information are updated in the databases.

Because the resource object accurately reflects the configuration and/or states of corresponding resources, a user may be quickly and efficiently provisioned with network resources, may control, and/or may monitor the network resources (e.g., a server, a server farm, a load balancer, etc.) by selecting, controlling, and/or monitoring the corresponding resource object.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIGS. 9 and 10, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by one or more devices in a system, parameters for provisioning a set of network resources that corresponds to a resource object;
   selecting, from pools of different types of network resources in a network, network resources of the set of network resources based on:

the parameters,
configuration information, and
inventory information including an inventory of a pool of storage devices, a pool of server devices, and a pool of other physical devices, in a state of availability for provisioning, in the system;
configuring the selected network resources in accordance with the parameters, wherein configuring the selected network resources includes provisioning a storage device, of the pool of storage devices, which is zoned in a same area of the network as a server device of the pool of server devices;
monitoring the selected network resources to obtain information on the selected network resources, wherein monitoring the selected network resources include tracking changes in a physical location of one or more of the selected network resources;
updating, by one or more devices in the system, the inventory information and the configuration information, based on the obtained information, to reflect changes in the pool of storage devices, the pool of server devices, and the pool of other physical devices with respect to the state of availability for provisioning and the configuration of the selected network resources; and
instantiating the resource object to create members that include information indicative of the physical location of the selected network resources.

2. The method of claim 1, wherein the resource object includes at least one of:
a firewall object, load balancer object, router object, or storage volume object.

3. The method of claim 1,
wherein the resource object corresponds to a physical server.

4. The method of claim 3, wherein instantiating the resource object includes creating members that further include a server identifier, network identifier, hostname, and Internet Protocol (IP) address.

5. The method of claim 3, wherein instantiating the resource object includes creating a member that includes at least one of:
a first identifier that uniquely identifies the resource object; or
a second identifier associated with the physical server.

6. The method of claim 1, wherein receiving parameters includes:
interacting with a user device via a browser interface.

7. The method of claim 1, further comprising:
creating a description of subtasks for provisioning the selected network resources;
placing the description of subtasks in a persistent queue in a database;
polling the persistent queue to obtain the description of subtasks; and
performing the subtasks.

8. The method of claim 1, wherein selecting network resources includes:
determining whether the network has capacity to provision a server farm.

9. The method of claim 1, further comprising:
de-provisioning the selected network resources.

10. The method of claim 1, wherein updating the inventory information and the configuration information includes:
recording the configuration information in a configuration management database.

11. The method of claim 1, wherein configuring the selected network resources includes at least one of:
provisioning network resources that correspond to a farm object;
provisioning network resources that correspond to a virtual firewall;
provisioning network resources that correspond to a virtual load balancer object;
provisioning network resources that correspond to a virtual router object; or
provisioning network resources that correspond to a logical volume.

12. The method of claim 1, wherein configuring the selected network resources includes provisioning the server device by:
allocating storage space on the storage device that corresponds to the server device for installing an application;
installing the application; and
reconfiguring one or more network components of the server device.

13. A non-transitory computer-readable medium comprising computer-executable instructions, the computer-executable instructions including instructions for:
receiving a provisioning request for a virtual machine;
causing a hypervisor to instantiate the virtual machine, in response to the provisioning request, where instantiating includes creating members that include information indicative of a physical location of a physical device corresponding to a server object;
receiving parameters for provisioning the physical device corresponding to the server object;
provisioning the physical device based on the parameters and inventory information that identifies an inventory of pools of different types of physical devices in a state of availability for provisioning, and a location of the physical device in a system;
provisioning a storage device, of the pools of different types of physical devices, which is zoned in a same area of the system as the physical device;
monitoring the physical device for changes in the state of availability of the physical device, wherein monitoring the physical device includes tracking changes in the physical location of the physical device; and
updating the inventory information to reflect the changes in a pool of one type of physical devices, of the different types of physical devices, with respect to the state of availability for provisioning and the location of the physical device.

14. The non-transitory computer-readable medium of claim 13, further comprising instructions for:
generating a job description that is associated with provisioning the physical device; and
using the job description to perform workflow tasks associated with the provisioning of the physical device.

15. The non-transitory computer-readable medium of claim 14, wherein the workflow tasks include:
allocating physical storage resources of a network for the physical device; and
recording an inventory of the physical storage resources in a database.

16. The non-transitory computer-readable medium of claim 14, wherein the workflow tasks include:
provisioning an Ethernet card of the physical device; or
assigning the physical device to a virtual local area network.

17. The non-transitory computer-readable medium of claim 14, further wherein the workflow tasks include applying patches or provisioning an application.

18. A system comprising:

a first device to:

receive a request from a client device to provision a physical device that corresponds to a resource object;

a second device to:

provision the physical device based on inventory information that identifies an inventory of pools of different types of physical devices in a state of availability for provisioning, in the system, during an installation of an operating system on the physical device, configure the physical device in accordance with parameters that are provided in the request, provision a storage device, of the pools of different types of physical devices, which is zoned in a same area of the system as the physical device, and notify the client device that the physical device corresponding to the resource object is provisioned;

a third device to:

instantiate the resource object to create members that include information indicative of a physical location of the physical device; and a fourth device to:

provide the inventory information to other devices, and monitor the physical device to update the inventory information with respect to changes in a pool of one type of physical devices, of the different types of physical devices, relative to the state of availability for provisioning and to the physical location of the physical device.

* * * * *